Figure 1:
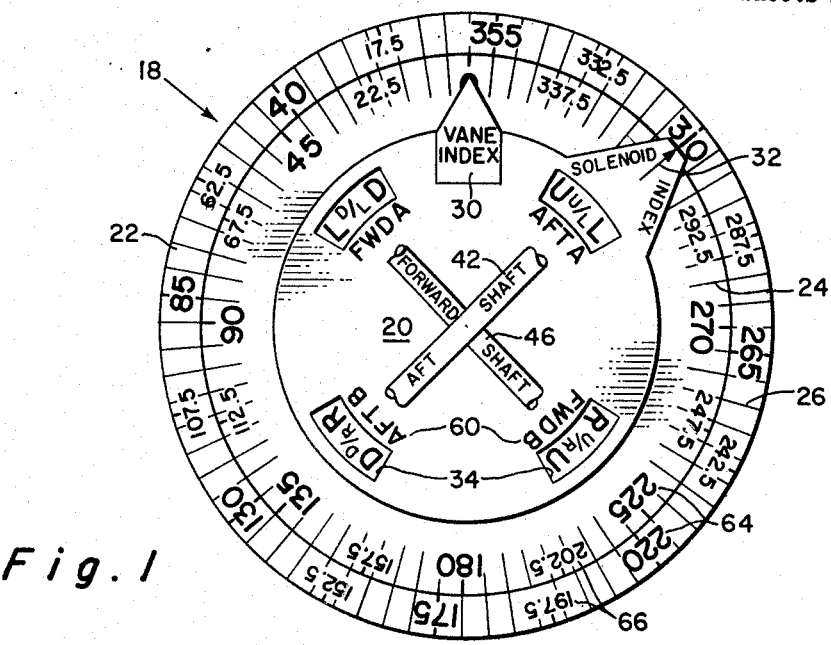

Sept. 29, 1964  J. B. COPENHAVER  3,150,824
COMMAND COMPUTER FOR USE WITH FREE-ROLLING GUIDED MISSILES
Filed Sept. 14, 1960  4 Sheets-Sheet 1

INVENTOR.
JAMES B. COPENHAVER
BY
George J. Rubens
ATTORNEY

Sept. 29, 1964    J. B. COPENHAVER    3,150,824
COMMAND COMPUTER FOR USE WITH FREE-ROLLING GUIDED MISSILES
Filed Sept. 14, 1960                     4 Sheets-Sheet 2

INVENTOR.
JAMES B. COPENHAVER
BY
ATTORNEY

INVENTOR.
JAMES B. COPENHAVER
BY
ATTORNEY

Sept. 29, 1964      J. B. COPENHAVER      3,150,824
COMMAND COMPUTER FOR USE WITH FREE-ROLLING GUIDED MISSILES
Filed Sept. 14, 1960      4 Sheets-Sheet 4

TABLE I
CONTROL SOLENOID OR CONTROL VANE RESPONSE TO TRANSMITTED COMMANDS, AS A FUNCTION OF ROLL POSITION

| ROLL POSITION DEGREES | U | | U/L | | L | | D/L | | D | | D/R | | R | | U/R | |
|---|---|---|---|---|---|---|---|---|---|---|---|---|---|---|---|---|
| | FWD SHAFT | AFT SHAFT | FWD SHAFT | AFT SHAFT | FWD SHAFT | AFT SHAFT | FWD SHAFT | AFT SHAFT | FWD SHAFT | AFT SHAFT | FWD SHAFT | AFT SHAFT | FWD SHAFT | AFT SHAFT | FWD SHAFT | AFT SHAFT |
| 337.5 – 22.5 | B | A | – | A | A | A | A | – | A | B | – | B | B | B | B | – |
| 22.5 – 67.5 | B | – | B | A | – | A | A | A | A | – | A | B | – | B | B | B |
| 67.5 – 112.5 | B | B | B | – | B | – | – | B | B | A | A | A | A | – | A | B |
| 112.5 – 157.5 | – | B | – | B | B | B | B | – | B | A | – | A | A | A | A | – |
| 157.5 – 202.5 | A | – | A | B | B | B | B | B | B | – | B | A | – | A | A | A |
| 202.5 – 247.5 | A | A | A | – | A | – | – | B | B | B | B | B | B | – | B | A |
| 247.5 – 292.5 | A | A | A | A | A | A | A | B | B | B | B | B | B | B | B | – |
| 292.5 – 337.5 | – | A | A | A | A | – | A | – | – | B | B | B | B | A | A | B |

Fig. 8

TABLE II
SPACE RESPONSE TO CONTROL SOLENOID OR CONTROL VANE ACTION AS A FUNCTION OF ROLL POSITION

| ROLL POSITION DEGREES | SOLENOID OR CONTROL VANE ACTION | | | |
|---|---|---|---|---|
| | FWD B | FWD A | AFT B | AFT A |
| 337.5 – 22.5 | R-U/R-U | L-D/L-D | D-D/R-R | U-U/L-L |
| 22.5 – 67.5 | U/R-U-U/L | D/L-D-D/R | D/R-R-U/R | U/L-L-D/L |
| 67.5 – 112.5 | U-U/L-L | D-D/R-R | R-U/R-U | L-D/L-D |
| 112.5 – 157.5 | U/L-L-D/L | D/R-R-U/R | R-U-U/L | D/L-D-D/R |
| 157.5 – 202.5 | L-D/L-D | R-U/R-U | U/R-U-U/L | D-D/R-R |
| 202.5 – 247.5 | D/L-D-D/R | U/R-U-U/L | U/L-L-D/L | D/R-R-U/R |
| 247.5 – 292.5 | D-D/R-R | U-U/L-L | L-D/L-D | R-U/R-U |
| 292.5 – 337.5 | D/R-R-U/R | U/L-L-D/L | D/L-D-D/R | U/R-U-U/L |

Fig. 9

*INVENTOR.*
JAMES B. COPENHAVER
BY
*ATTORNEY*

United States Patent Office 3,150,824
Patented Sept. 29, 1964

3,150,824
COMMAND COMPUTER FOR USE WITH FREE-ROLLING GUIDED MISSILES
James B. Copenhaver, 1712 Vineyard St., Bluefield, W. Va.
Filed Sept. 14, 1960, Ser. No. 56,066
3 Claims. (Cl. 235—78)
(Granted under Title 35, U.S. Code (1952), sec. 266)

The invention described herein may be manufactured and used by or for the Government of the United States of America for governmental purposes without the payment of any royalties thereon or therefor.

The present invention relates to a command computer and more particularly to a command computer for solving command signals transmitted to a free rolling type guided missile.

In order to determine the performance of a guided missile while it is in flight, it is necessary to coordinate the response of the missile to various command signals. The response of the free rolling type missile can be obtained by telemetering information from the missile itself such information being its roll position and the direction of deflection of its control vanes. A typical problem in determining the performance of such a missile is to solve the command signals which correspond to the known telemetered data. Heretofore, the only computer that could solve such a problem has been the complicated and costly electronic type computer requiring highly skilled programming specialists. There existed a need for a portable inexpensive command computer which could be operated by personnel who were unfamiliar with the theory of operation of the missile's control system. The present invention has met this need by providing a unique and inexpensive mechanical slide rule which will solve the command signals corresponding to given telemetered data.

Accordingly, an object of the present invention is to provide a computer which will correspond data concerning the flight of a free rolling guided missile.

Another object is to provide a computer which will solve the command signals transmitted to a free rolling guided missile having known data concerning the response of the missile's control system.

A further object of the invention is to provide a computer which will solve a command signal transmitted to a free rolling missile, having known the missile's roll position and the direction of deflection of its control vanes.

Figure 2:
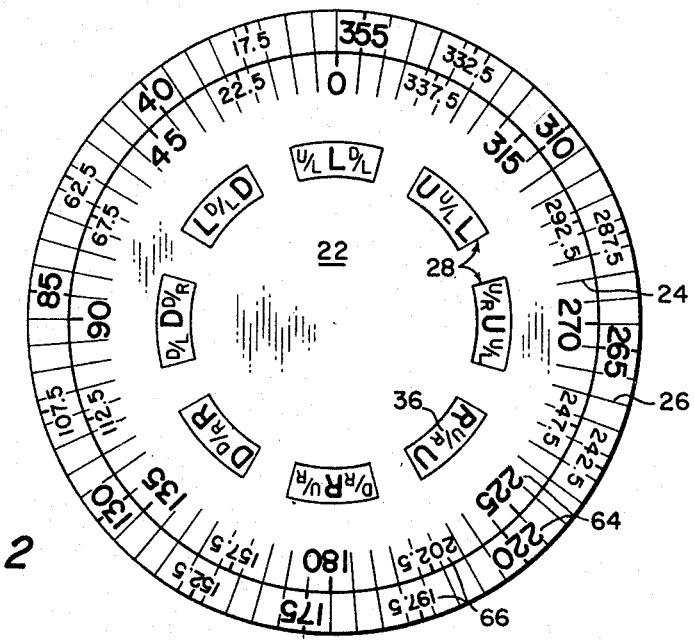
Figure 3:
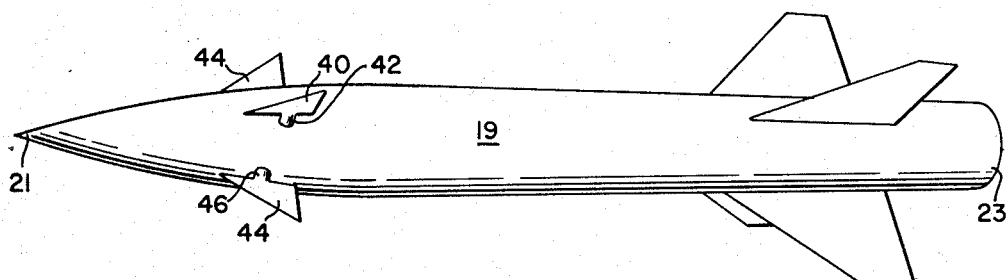
Figure 4:
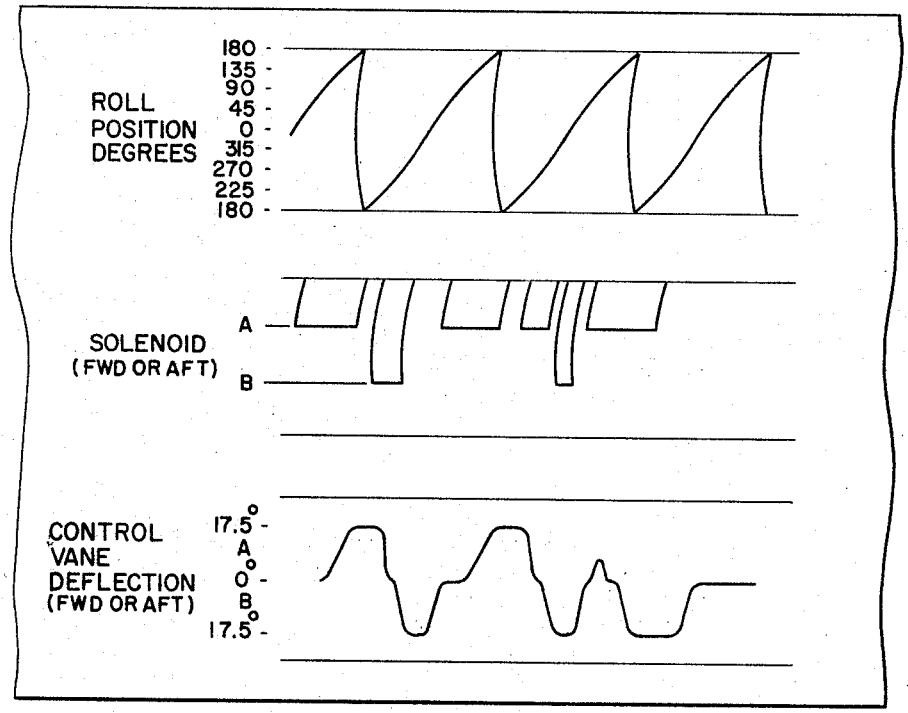
Figure 5:
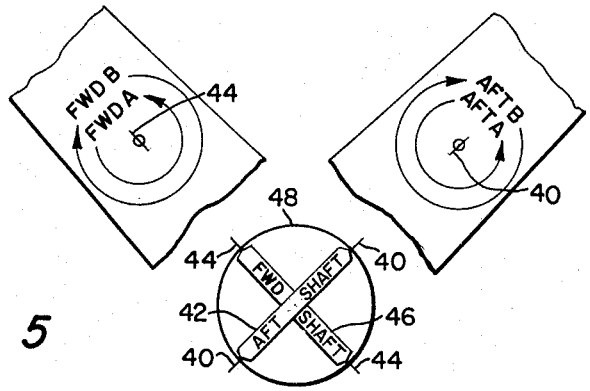
Figure 6:
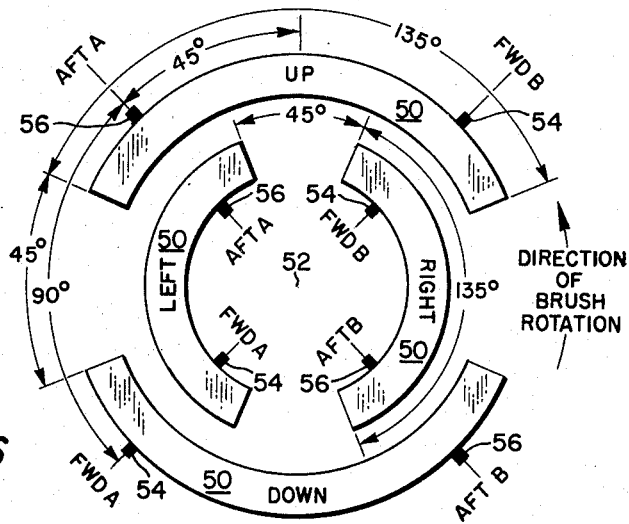
Figure 7:
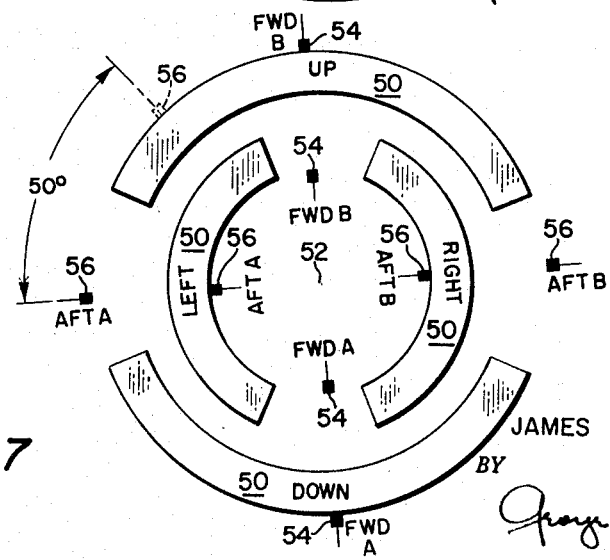

Other objects and many of the attendant advantages of this invention will be readily appreciated as the same become better understood by reference to the following detailed description when considered in connection with the accompanying drawings wherein:

FIG. 1 is a plan view of the command computer.
FIG. 2 is a plan view of the lower disc of the command computer.
FIG. 3 is a perspective view of a free rolling guided missile.
FIG. 4 is an example of typical control data telemetered from the missile.
FIG. 5 is a diagrammatic after view of the missile's control shafts and vanes with top views showing each upper vane on the missile.
FIG. 6 is a diagrammatic after side view of a portion of the missile's electrical control system without allowance for time delay in the control system and with the missile in zero roll position.
FIG. 7 is a diagrammatic after side view of the electrical control system shown in FIG. 6 with allowance for time delay in the control system.
FIG. 8 is a tabulation of the missile's shafts responses to various command signals within particular ranges of roll of the missile.
FIG. 9 is a tabulation compiled from the tabulation of FIG. 8 showing the possible command signals for a given direction of rotation of a particular control shaft within various ranges of roll positions.

Referring now to the drawings, wherein like reference numerals designate like or corresponding parts throughout the several views, there is shown in FIG. 1 a preferred embodiment of a command computer 18 for solving problems concerning response of a free rolling guided missile 19 to various command signals. The command computer has an upper disc 20 rotatably and concentrically mounted on a lower disc 22, the lower disc 22 having (1) an inner roll position scale 24 for solving problems involving response of the missile's control vanes 40 and 44 and (2) an outer roll position scale 26 for solving problems involving response of the missile's control solenoids (not shown). Concentric to the roll position scales 24 and 26 are groups of possible command signals 28 which are placed on the lower disc 22 so as to correspond to particular ranges or sectors of degrees, the middle and ends of each of these ranges being designated by large roll position nomenclature 64 and small roll position nomenclature 66 respectively. The upper disc 20 has a vane index 30 for pointing to the inner scale 24, a solenoid index 32 for pointing to the outer scale 26 and apertures 34 spaced 90° from each other for exposing the groups of possible command signals 28. Adjacent each of the apertures 34 is rotation nomenclature 60 designating a particular direction of rotation of the missile's control shafts 42 and 46, which rotation indicates that the missile's control vanes 40 and 44 mounted on the shafts have been correspondingly deflected. Thus, by pointing the index 30 to a large sized numeral 64 closest to the given degree of roll of the missile, the apertures 34 will each expose a group of possible commands 28, the group underlying a particular aperture being the possible command signals for the shaft rotation designated adjacent this aperture. If only one shaft has been rotated, a middle command signal 36 exposed by a selected aperture 34 is the correct command signal, and if both shafts 42 and 46 have rotated, the correct command signal is one of the command signals on either side of the middle command signal 36 which appears in two selected apertures 34.

In order to understand the theory of operation of the command computer, it is necessary to understand some of the mechanics of the free rolling type of guided missile 19 and correlate its control system with the nomenclature on the computer 18. The computer is intended to be used for corresponding control data on any free rolling type of guided missile regardless of the control system employed, however, for purposes of this explanation the free rolling guided missile 19 having a particular control system will be described. This missile 19, having a forward end 21 and an after end 23, rolls in its entirety around its longitudinal axis as it travels through space and is controlled in its direction of flight by an after pair of control vanes 40 mounted on an after control shaft 42 and a forward pair of control vanes 44 mounted on a forward control shaft 46. In FIG. 5, the control shafts 42 and 46 and the control vanes 40 and 44 are shown diagrammatically looking from an after end of the missile. Arbitrarily, the direction of rotation of the shafts 42 and 46 is designated as "B" when rotating in a clockwise direction and as "A" when rotating in a counterclockwise direction, these directions being determined by looking at the vanes which project from an upper half 48 of the missile. Accordingly, the direction of deflection of either pair of vanes 40 and 44 will be the same as the shaft to which the pair is attached. Each of the apertures 34 has rotation nomenclature 60 designating one of the shafts 42 or 46 rotating in an "A" or a "B" direction. In FIG. 6 there is shown four space stabilized commutator segments 50 which receive command signals transmitted to the missile, the up segment being positioned in the upper half 48 of the missile, the right and left segments being positioned in a right and left portion of the missile respectively (looking forward) and the down segment being positioned in a lower or down portion of the missile. Each segment circumscribes a 135° arc around a longitudinal axis 52 of the missile leaving a 45° open space between the ends of the up and down segments and a 45° open space between the ends of the right and left segments. Forward brushes 54 and after brushes 56 rotate with the roll of the missile around its longitudinal axis 52 picking up the command signals as they brush the segments 50. The forward and after brushes designated "B" are coupled through forward and after solenoids respectively (not shown) to an actuator (not shown) which rotates a corresponding shaft in a "B" direction and the forward and after brushes designated "A" are coupled through forward and after solenoids respectively (not shown) to an actuator which rotates a corresponding shaft in an "A" direction. The forward brushes 54 are spaced 90° from the after brushes 56 and looking from an after end 23 of the missile all the brushes 54 and 56 rotate in a counterclockwise direction, the position of the brushes as shown in FIG. 6 being arbitrarily a zero position. With a control system as shown in FIG. 6, it is now apparent that eight different command signals can be transmitted to the missile, namely up, down, right, left, up-right, up-left, down-right and down-left. Accordingly, as the brushes rotate with the roll on the missile around the commutator segments 50, various but consistent patterns of signals are picked off of the segments depending upon the command signal that is given, the vanes 40 and 44 being deflected in an "A" or "B" direction only when their corresponding brushes are picking up signals. The patterns of signals that are developed for various command signals as the brushes 54 and 56 rotate are shown in a table in FIG. 8. Thus, for an up command with the brushes 54 and 56 rotated to the position shown in FIG. 6 the forward shaft 46 would be rotated in a "B" direction and the after shaft 42 would be rotated in an "A" direction, the control vanes 40 and 44 mounted on the shafts being correspondingly deflected to guide the travel of the missile. This control shaft response will remain the same so long as the roll position of the missile remains within a sector of roll positions which extends 22.5° on both sides of the zero position of the brushes as shown in FIG. 6. There will be eight such sectors, 45° in arc, in the control system shown in FIG. 6 and as the brushes 54 and 56 rotate they will pick up a new sector whenever they brush off of or brush onto the commutator segments 50.

By considering the response of the control shafts 42 and 46 to the eight possible commands within each sector of roll positions, the table in FIG. 8 can be developed showing the direction of rotation of the shafts 42 and 46 for each of the eight commands within each of the eight sectors of roll. Having the table shown in FIG. 8, the table shown in FIG. 9 can easily be tabulated according to groups of possible command signals for one of the shafts 42 or 46 rotating in an "A" or "B" direction within a sector of roll positions. For instance, from the table in FIG. 8 it can be seen that if the roll position is between 337.5° and 22.5° the possible commands that could have been transmitted to the missile when the forward shaft 46 is rotating in a "B" direction are right, up-right and up which is tabulated as "R-U/R-U" in FIG. 9. It will be noted from the table in FIG. 8 that two out of the three commands within each group of commands shown in the table of FIG. 9 rotate both the forward shaft and the after shaft, the third command within each group rotating only one of the shafts. With this in mind the command within each group rotating only one of the shafts is placed between the other two commands so that when it is known that only one shaft has rotated, the middle command within the appropriate group is the command signal in question. Accordingly, in the group "R-U/R-U" in the table of FIG. 9 the "U/R" command actuates only the forward shaft 46 (see FIG. 8) and the other two commands "R" and "U" each actuate both the forward and after shafts.

The command computer shown in FIG. 1 incorporates the data tabulated in the table in FIG. 9 so that (1) the command signal transmitted, (2) the roll position of the missile or (3) the direction of rotation of the control shafts can be solved, providing any two of these quantities are known. The two possible directions of rotation for each of the control shafts 42 and 46 are represented individually by a corresponding aperture 34 in the upper disc 20 of the computer the apertures being spaced 90° from each other. Adjacent each of the apertures 34 is shaft rotation nomenclature 60 designating one of the control shafts rotating in an "A" or a "B" direction. The roll position of the missile (for solving problems involving the missile's vane action) is laid out on the lower disc 22, the degrees increasing in a counterclockwise direction since that is the direction of roll of the missile as stated previously. The groups of possible command signals as shown in the table in FIG. 9 are designated by groups of possible commands nomenclature 28 positioned on the lower disc 22, so as to underlie the apertures 34 on the upper disc 20. The nomenclature 28 is further positioned on the lower disc 22 in accordance with the tabulation in the table in FIG. 9. Accordingly, the nomenclature 62 is positioned on the lower disc 22 to directly underlie an appropriate apperture when the vane index 30 is rotated to a roll position which is halfway between any of the sectors of roll positions given in the latter table. The roll positions in this table which are halfway between the sectors of roll positions are designated by large roll position nomenclature 64 and the roll position representing the extremities of the sectors of roll positions are designated by small roll position nomenclature 66. Since the shaft response for any given command within any sector of roll positions as shown in FIG. 9 does not change, it is intended that the vane index 30 be pointed to one of the large roll position nomenclature 64 closest to the particular roll position involved in a problem. Accordingly, if the given roll position was any roll between 337.5° and 22.5° the vane index 30 would be pointed to 0° on the lower disc.

A problem that has not been considered up to this point is the possibility of a delay in the rotation of the shafts 42 and 46, after a command is transmitted to the missile due to the response of the shaft actuator system (not shown). This delay is especially found in pneumatic actuator systems and as shown in FIG. 7, is compensated for by advancing the roll of the brushes around the commutator segments. The amount of the advance depends upon the actuator delay and the rate of the roll of the missile and assuming that the missile rolls 50° before the shafts respond the brushes will be advanced 50° to allow for this delay. Assuming that the actuators of the control shafts are energized by solenoids (not shown) which in turn are coupled to the brushes, the solenoids will be energized 50° before the control shafts respond thereto. Accordingly, the solenoid index 32 is positioned 50° in a clockwise direction from the vane index 30 for solving problems involving solenoid response of the missile. Assuming that the brushes are advanced 50° to allow for actuator delay, the extremities of the sectors of roll for solenoid response will not correspond to the extremities of the sectors of roll. Accordingly, the outer roll position scale 26 is placed on the lower disc 22 with its roll position ranges shifted 50° for use when the problem involves solenoid response. The roll position scale has large and small nomenclature representing the middle and the extremities respectively of the solenoid roll position sectors in the same manner as provided for the inner roll position scale 24. It is to be noted, however, that the degrees of rotation on the outer scale 26 still correspond to the degrees of rotation on the inner scale 24, the sectors only being different, since the 50° advance of the brushes are already compensated for by the solenoid index 32 being offset 50° from the vane index 30. The theory behind the command computer is now complete using a particular control system of a free rolling type missile as an aid for explanation purposes. It is to be understood that the command computer is intended to be used with any free rolling type missile even though the control system therein is varied. Several possible variations in the control system are transmitting commands directly to the control vane actuators without going through commutator segments and brushes or rearranging the position and/or number of commutator segments and brushes in the particular control system described.

In the operation of the command computer it will be assumed that the operator has telemetry data from the missile as shown in FIG. 4. This data shows the action of the solenoids (not shown) and the control vanes for various roll positions of the missile. Having this data, it is felt that a few examples will best explain the operation of the command computer.

*Example 1*

Knowns:
 (1) Roll position: 320°
 (2) Control vane deflection: Forward B
Problem: Find the command transmitted
Answer: A right command
Explanation: Place the vane index on 315° on the inner scale since 315° is the closest large numbered degree to 320°. Look at the aperture designated Fwd B and read the middle command signal since only one control shaft has rotated, namely, the forward one.

*Example 2*

Knowns: Same as Example 1 except the after shaft has also rotated in an A direction
Problem: Find the command transmitted
Answer: An up-right command
Explanation: Set the vane index as in Example 1. Look at two apertures, one designated Fwd B and one designated Aft A since both of the shafts are rotated and read the command signal that is found below both apertures.

*Example 3*

Knowns:
 (1) Roll position: 270°
 (2) Solenoid response: Forward B
Problem: Find the command transmitted
Answer: A right command
Explanation: Set the solenoid index on 265° on the outer scale since 265° is the closest large numbered degree to 270°. Look at the aperture designated Fwd B and read the middle command signal since only one solenoid is energized, namely, the forward one.

*Example 4*

Knowns: Same as Example 3 except the after solenoid is also energized in an A direction
Problem: Find the transmitted command
Answer: An up-right command
Explanation: Set the solenoid index as in Example 3. Look at two apertures, one designated Fwd B and the other designated Aft A and read the command signal found below both apertures.

*Example 5*

Knowns:
 (1) Command: Down-left
 (2) Roll position: 105°
Problem: Find expected control vane response
Answer: Aft A Explanation: Set the vane index to 90° on the inner scale and look for the apertures having a down-left command. It appears under the Aft A aperture only.

*Example 6*

Knowns:
 (1) Command: Left
 (2) Roll position: 105°
Problem: Find expected control vane response
Answer: Aft A and Fwd B
Explanation: Set the vane index as in Example 5 and look for the apertures having a left command. The apertures designated Aft A and Fwd B have such a command.

*Example 7*

Knowns: Same as Example 5
Problem: Find solenoid response
Answer: Aft A and Fwd B
Explanation: Set the solenoid index to 85° on the outer scale and look for the apertures having a down-left command. The Aft A and Fwd B apertures have such a command.

The examples could be carried further showing how to determine the sector of degrees, the knowns being the command transmitted and the vane action or the solenoid action. It is felt, however, that the above examples are sufficient background to enable one to solve problems where the sector of roll positions is in question.

It is now apparent that the invention provides a simple and convenient computer which can be worked by an unskilled technician having no knowledge of the operation of the control system of the missile. He need merely follow the rules for using the computer. Further, the invention has provided a novel computer which eliminates the requirement of reducing telemetered data by an expensive and complicated electronic computer which is programmed by a highly skilled technician.

Obviously, many modifications and variations of the present invention are possible in the light of the above teachings. It is, therefore, to be understod that within the scope of the appended claims, the invention may be practiced otherwise than as specifically described.

I claim:

1. A computer for solving a command signal in question transmitted to a missile having partially overlapping space stabilized commutator segments receiving command signals, each segment and the overlapping portions thereof representing a different command signal and the missile having rotating brushes which pick up the command signals impressed on the commutator segments to actuate a means for deflecting missile control vanes, the brushes and the control vanes rotating at the same rate around a longitudinal axis of the missile with the degree of rotation of the brushes and vanes with respect to a reference point being known for computer purposes, said computer comprising an upper disc concentrically overlying and rotatably mounted on a lower disc, the upper disc having a vane pointer for pointing to nomenclature on the lower disc designating a degree of rotation of the brushes and the control vanes, said upper disc having nomenclature adjacent apertures therein designating particular control vanes and their direction of deflection, the apertures overlying and indicating indicia on the lower disc designating command signals, the indicia designating command signals being grouped, each group representing possible command signals within a particular sector of rotation of the vanes and brushes, the indicium of one of the command signals within each group being distinctive from the remainder of the indicia within the group, the distinctive command signal indicium representing the command signal in question when only one of the control vanes has been deflected whereby upon pointing the vane pointer to a known degree of rotation of the vanes and brushes, the group of possible command signals will underlie the aperture corresponding to a known vane and its deflection, the distinctive indicium within the group indicating the command signal in question unless two or more control vanes are deflected whereupon any matching command signals within the groups indicated by indicia representing the two or more vanes and their deflection will be the command signal in question.

2. A computer as claimed in claim 1 further comprising said nomenclature designating degree of rotation of the brushes and control vanes on the lower disc being divisible into sectors, each sector corresponding to a sector of rotation by the brushes where the brushes retain the same electrical contact with the commutator segments, said lower disc having distinctive nomenclature at the middle of each of said sectors whereby upon pointing the vane pointer to the distinctive nomenclature closest to the known degree of rotation of the vanes and brushes, the group of possible command signals will underlie the aperture corresponding to a known vane and its deflection, the distinctive indicium within the group indicating the command signal in question unless two or more control vanes are deflected whereupon the matching command signals within the groups indicated by indicia representing the two or more vanes and their deflection will be the command signal in question.

3. A computer as claimed in claim 2 for solving a command signal transmitted to the missile of the type wherein said means for deflecting the missile's control vanes includes solenoids coupled to the brushes for operating control vane actuators, the control vane actuators having a delay in operation so that the missile's vanes respond a predetermined time after the command signal is picked up by the brushes, the brushes rotating a predetermined number of degrees in said predetermined time wherein said computer further comprises said upper disc having a solenoid pointer offset from the vane pointer by the number of degrees that the brushes rotate in said predetermined time for pointing to additional distinctive nomenclature on the lower disc and said additional distinctive nomenclature being offset from the distinctive nomenclature used for the vane pointer by the same number of degrees that the solenoid pointer is offset from the vane pointer whereby upon pointing the solenoid pointer to additional distinctive nomenclature closest to the known degree of rotation of the vanes and brushes, the group of possible command signals will underlie the aperture corresponding to a vane deflection which in turn corresponds without allowance for delay to a known solenoid response, the distinctive indicium within the group indicating the command signal in question unless two or more control vanes are deflected.

References Cited in the file of this patent

UNITED STATES PATENTS

| | | |
|---|---|---|
| 2,221,924 | Pickworth | Nov. 19, 1940 |
| 2,550,458 | Drescher | Apr. 24, 1951 |
| 2,591,058 | Freeman | Apr. 1, 1952 |